(12) United States Patent
Caswell et al.

(10) Patent No.: US 7,024,552 B1
(45) Date of Patent: *Apr. 4, 2006

(54) LOCATION AUTHENTICATION OF REQUESTS TO A WEB SERVER SYSTEM LINKED TO A PHYSICAL ENTITY

(75) Inventors: Deborah L. Caswell, Santa Clara, CA (US); Jeffrey Alan Morgan, Cupertino, CA (US); Venkatesh Krishnan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 942 days.

This patent is subject to a terminal disclaimer.

(21) Appl. No.: 09/684,946

(22) Filed: Oct. 4, 2000

Related U.S. Application Data

(63) Continuation-in-part of application No. 09/633,077, filed on Aug. 4, 2000.

(51) Int. Cl.
*H04L 9/00* (2006.01)
*H04K 1/00* (2006.01)
*G06F 17/60* (2006.01)

(52) U.S. Cl. .................. 713/155; 713/158; 713/159; 713/176; 380/30; 380/258; 705/65; 705/67

(58) Field of Classification Search ............ 380/258, 380/30; 713/155, 158, 159, 176; 705/65, 705/67

See application file for complete search history.

(56) References Cited

U.S. PATENT DOCUMENTS

| 5,175,766 A | 12/1992 | Hamilton |
| 5,664,948 A | 9/1997 | Dimitriadis et al. |
| 5,757,916 A | 5/1998 | MacDoran et al. |
| 5,812,668 A | 9/1998 | Weber |

(Continued)

FOREIGN PATENT DOCUMENTS

EP 0919960 2/1999

OTHER PUBLICATIONS

Bruce Schneier, Applied Cryptography, 1996, John Wiley & Sons, Inc. pp. 173-174.*

(Continued)

*Primary Examiner*—Gilberto Barrón, Jr.
*Assistant Examiner*—Benjamin E. Lanier

(57) ABSTRACT

A system for authenticating the location of a client system accessing a web server system associated with a physical entity includes a location beacon adjacent to the physical entity. The location beacon transmits a first beacon signal containing a web address of the web server system and a token that expires within a predetermined time period. A beacon receiver in the client system receives the first beacon signal, and sends a first request having the token and a key generated by a random number generator in the client system to the web server system. A location authentication module in the web server system retrieves the key from the first request if the token has not expired. A location authentication beacon adjacent to the physical entity transmits a second beacon signal containing the web address and a customized token encrypted using the key. The beacon receiver receives the second beacon signal and uses the key to decrypt the customized token. A web browser in the client system sends a second request having the web address and the customized token to the web server system if the beacon receiver can decrypt the customized token with the key. A method of authenticating locations of clients accessing a web server system is also described.

12 Claims, 8 Drawing Sheets

U.S. PATENT DOCUMENTS

| | | | |
|---|---|---|---|
| 5,850,446 | A | 12/1998 | Berger et al. |
| 5,892,900 | A | 4/1999 | Ginter et al. |
| 5,931,917 | A | 8/1999 | Nguyen et al. |
| 5,943,323 | A | 8/1999 | Olanders et al. |
| 5,943,423 | A | 8/1999 | Muftic |
| 5,963,915 | A * | 10/1999 | Kirsch .................. 705/26 |
| 6,013,007 | A | 1/2000 | Root et al. |
| 6,049,877 | A | 4/2000 | White |
| 6,199,753 | B1 * | 3/2001 | Tracy et al. ............ 235/375 |
| 6,226,752 | B1 | 5/2001 | Gupta et al. |
| 6,253,325 | B1 | 6/2001 | Steele et al. |
| 6,266,612 | B1 | 7/2001 | Dussell et al. |
| 6,571,252 | B1 | 5/2003 | Mukherjee |

OTHER PUBLICATIONS

Tim Kindberg, "People, Places, Things: Web Presense for the Real World", IEEE, Feb. 2000, pp. 19-28.* http://www.cooltown.hp.com, Nov. 29, 1999, archive.org, pp. 1-4.*

Stephen Shankland, "HP flaunts new tech to raise lab profile", CNETNews.com, Nov. 5, 1999, pp. 1-4.*

David Hamilton, "Venerable H-P Labs to Drop Its 'Aw Shucks' Attitude", Wall Street Journal, Oct. 21, 1999, pp. 1-2.*

U.S. Appl. No. 09/633,077, First non-final office action, date mailed Feb. 24, 2004.

U.S. Appl. No. 09/633,077, Response to first non-final office action, date mailed Aug. 23, 2004.

U.S. Appl. No. 09/704,394, First non-final office action, date mailed Jun. 4, 2003.

U.S. Appl. No. 09/704,394, Response to first non-final office action, date mailed Sep. 4, 2003.

U.S. Appl. No. 09/704,394, Second non-final office action, date mailed Dec. 31, 2003.

U.S. Appl. No. 09/702,394, Response to second non-final office action, date mailed Mar. 31, 2004.

U.S. Appl. No. 09/704,394, Third non-final office action, date mailed Jul. 14, 2004.

U.S. Appl. No. 09/704,394, Interview Summary, date mailed Oct. 12, 2004.

U.S. Appl. No. 09/704,394, Response to third non-final office action, date mailed Oct. 14, 2004.

* cited by examiner

LOCATION AUTHENTICATION OF REQUESTS TO A WEB SERVER SYSTEM LINKED TO A PHYSICAL ENTITY

CROSS-REFERENCE TO RELATED APPLICATION

This application claims priority as a continuation-in-part from U.S. patent application Ser. No. 09/633,077 entitled, "A Location Sensitive Web Server System" having inventors Deborah L. Caswell, Jeffrey A. Morgan, and Venkatesh Krishnan, and a filing date of Aug. 4, 2000.

BACKGROUND OF THE INVENTION

1. Field of the Invention

The present invention pertains to creating a web representation for a physical entity. More particularly, this invention relates to a location authentication mechanism that authenticates locations or positions of users or clients that generate access requests to a web server system with respect to a physical entity associated with the web server system such that the web server system can provide location-dependent or location-sensitive web services to external requests.

2. Description of the Related Art

As we know, the world we live in is a physical world that is formed by physical entities such as people, places, and things (or objects). For example, a bookstore is a place. So is a museum, an exhibition hall, a conference room, or a home. A book in a bookstore or a painting in a museum or exhibition hall is a thing. Likewise, a TV is a thing. A bus stop can be referred to as a place. These are some examples of physical entities.

With the rapid growth of the Internet and widespread use of the World Wide Web (WWW), more and more physical entities now have their own web sites and/or web pages. This form of representation for the physical entities is typically referred to as non-physical or virtual representation. In this case, each physical entity can have one or more web pages. In addition, each web page can also represent one or more physical entities. These web pages use written text, audio, video, and/or images to describe or illustrate their respective physical entities. The web pages may also provide services (e.g., e-commerce) for their physical entities. A person can simply go to the web pages of a physical entity to get information about the physical entity, or to conduct a business transaction with the physical entity (i.e., on-line transaction or e-commerce). These web pages form the virtual world or cyberspace of the physical world.

The web representation allows the physical entities to become more useful, convenient, and accessible. For example, instead of physically posting, at a particular bus stop, the arrival and departure schedules of various buses at that particular bus stop, the bus stop is equipped with its own web page which lists all the arrival and departure times so customers can access the information anywhere and anytime so long as they have the web address of the web page. The web page is also automatically updated in real time, thus avoiding the need for the employees of the bus company to physically post any change of the posted schedule. This provides people with accurate information cost-effectively and efficiently. As a further example, a retail store may have a web page that describes the merchandise it offers, directions to the store, and store hours. The web page might also provide easy email access for asking questions. Some stores might offer on-line ordering through their web pages.

However, although a physical entity in real world may have its web-based representation, the two are not tightly connected. This means that there is no means for bridging the two worlds together. In other words, the prior art structure does not provide means for linking people who are accessing a physical entity to its web page. For a person to find the right web page of a physical entity, the person either has to memorize the web address of the web page, or has to find the web page through searching and browsing the Web. This causes difficulty and inconvenience for the users to access those web pages. The inconvenience has increasingly become obvious because the Web has now grown to contain millions of millions of web sites and/or web pages. In addition, web pages are typically within a web site. The address of a web site can be relatively short and easy to remember. For example, the address of the web site of Hewlett-Packard Company is "www.hp.com" while the address of the web site for Microsoft Corporation is "www-.microsoft.com". However, this is not the case for the address of a web page within a web site. For example, the address of the web page for a particular turtle neck sweater on the Gap Inc's web site may be "www.gap.com/onlinestore/gapstore/product.asp?wpid=12977&sid=7HWUHN GFFSS12H0B00AKH2QFP8FE1BP4&wdid=214". This is very hard to remember and use. The reason that the address is so long and confusing is that these web pages are transient and can be changed on a regular basis because physical inventory changes rapidly.

In addition, the prior web server system that hosts the web sites or web pages for the physical entity cannot distinguish user access requests that are generated by the users at the physical location of the physical entity from other user access requests that are generated by the users not at the physical location. This means that the web server system does not take into consideration where the user accesses the web server for the physical entity. There are many ways that the user can obtain the web address of the physical entity and then access the web server for the physical entity. For example, the user can sit at home or office searching through various search engines to obtain the web address. In this case, the user access is a remote one. As a further example, the user may be at the location of the physical entity and see the web address posted there. Then the user accesses the web server at the very location of the physical entity. Because the prior web server system does not distinguish user access requests based on their location, the web server system cannot provide special information and/or service to users accessing the web server at the physical location. Often times, there exists a need for the web server system to know this information and to provide different information and/or services based on this information. However, no existing prior art technology is able to solve this problem.

The above-mentioned problems are also amplified by the fact that more and more people can now access the Web through their mobile electronic devices. As we know, with the increased availability of highly functional portable or mobile devices and development of wireless networking options, more and more people are always connected to the Web through their mobile browser, no matter where they are.

SUMMARY OF THE INVENTION

One feature of the present invention is to provide easy and quick web services that are location sensitive or location dependent.

Another feature of the present invention is to provide a location sensitive web access system for a physical entity that provides different services to users based on the users' relative positions or locations with respect to the physical entity.

A further feature of the present invention is to authenticate locations or positions of users or clients that generate access requests to a web server system associated with a physical entity such that the web server system can provide location-dependent or location-sensitive web services to external requests.

Below described is a system for authenticating the location of a client system accessing a web server system associated with a physical entity. The system includes a location beacon adjacent to the physical entity. The location beacon transmits a first beacon signal containing a web address of the web server system and a token that expires within a predetermined time period. A beacon receiver in the client system receives the first beacon signal, and sends a request having the token and a key generated by a random number generator in the client system to the web server system. A location authentication module in the web server system retrieves the key from the request if the token has not expired. A location authentication beacon adjacent to the physical entity transmits a second beacon signal containing the web address and a customized token encrypted using the key. The beacon receiver receives the second beacon signal and uses the key to decrypt the customized token. If it can decrypt the customized token, the web browser in the client system can access the web server system.

A method of authenticating the location of a client system accessing a web server system associated with a physical entity includes the step of transmitting a first beacon signal containing a web address of the web server system and a token that expires within a predetermined time period from a location beacon adjacent to the physical entity. If the client system receives the first beacon signal, it generates a random key and sends a first request to the web server system. The first request contains the web address, the token, and the key. The key is retrieved from the first request in the web server system if the token has not expired. The key is then used to encrypt a customized token. A second beacon signal containing the web address and the customized token is transmitted from a location authentication beacon adjacent to the physical entity. The client system decrypts the customized token using the key to determine if the second beacon signal is intended for the client system. The web server system services any subsequent request from the client system that contains the customized token.

A web server system for a physical entity is also described which includes a web server that generates content regarding the physical entity in response to external requests with the web address of the web server. A location beacon is placed adjacent to the physical entity to transmit a first beacon signal containing the web address and a token that expires within a predetermined time period. A location authentication beacon is placed adjacent to the physical entity to transmit a second beacon signal containing the web address and a customized token encrypted using a key. A location authentication module retrieves the key from a first request from a client system that has captured the first beacon signal if the token has not expired, and causes the web server to service a second request from the client system if the second request contains the customized token that has not expired.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
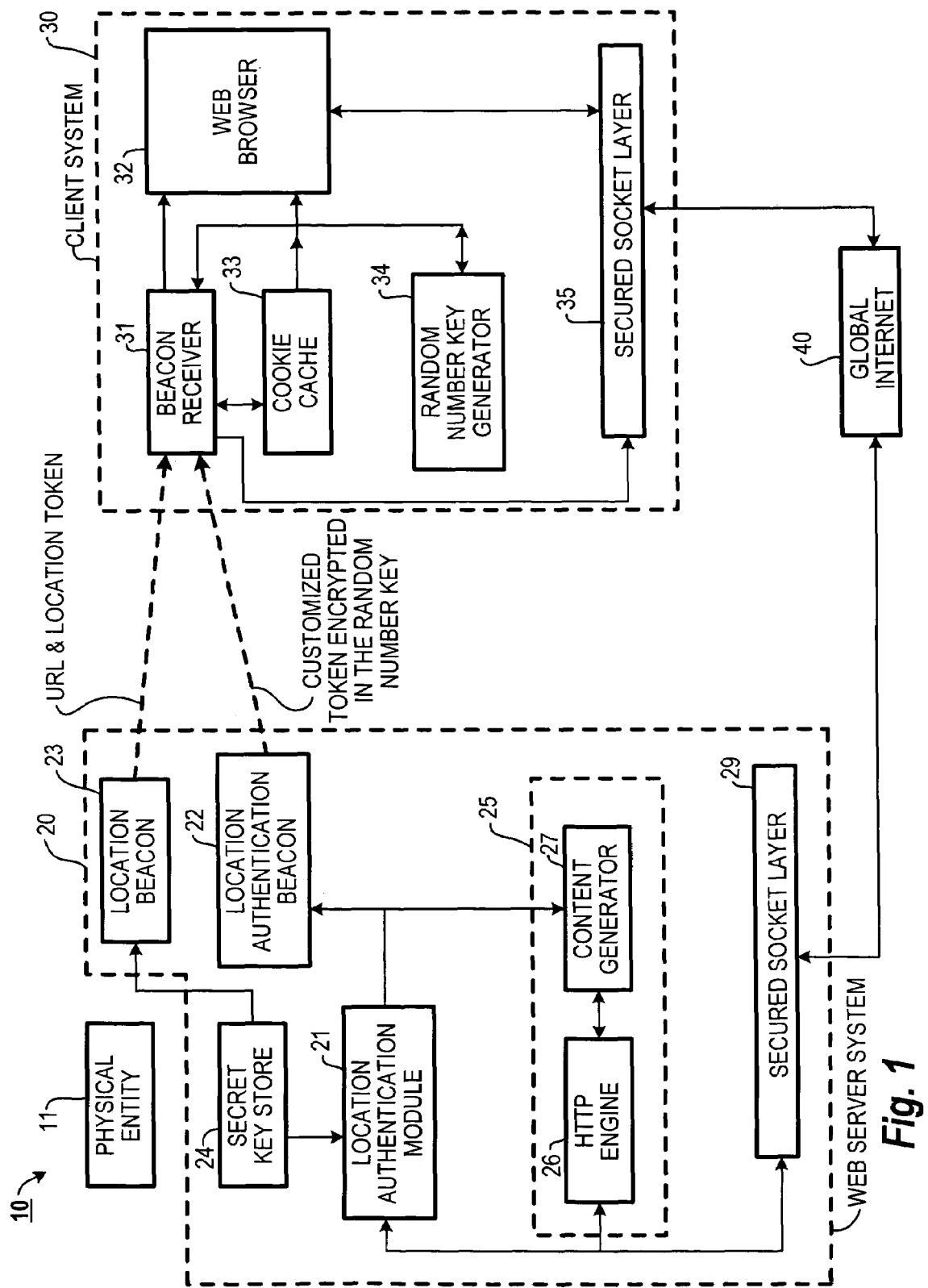
FIG. 1 shows a location sensitive web server system for a physical entity that includes a location authentication mechanism in accordance with one embodiment of the present invention.

FIG. 1 shows a location authentication system 10 that implements one embodiment of the present invention. The system 10 is implemented in a web server system 20 and a client system 30 accessing the web server system 20. The web server system 20 provides a web representation for a physical entity 11. The web representation may include web content pages and/or services (e.g., on-line conference room booking or scheduling, e-commerce).

The web server system 20 is a location sensitive web server system. This means that the web server 25 of the web server system 20 provides a special type of web services (e.g., extended web services) to external client systems (e.g., the client system 30) only if (1) the client systems are "close to" the physical entity 11 and (2) after the web server system 20 authenticates the locations of the client systems. The term "close to" is defined to mean that the client system (e.g., the client system 30) can be within, near, or adjacent to the physical entity 11.

The location sensitive feature of the web server system 20 means that if an access request is generated from a client system close to the physical entity 11, the web server system 20 provides web contents and/or services to the requesting client system. If the client system is not close to the physical entity 11 when receiving the web address of the web server system 20 and generating the access request, the web server system 20 does not provide any web contents and/or services to the requesting client device (or provides restricted service/content to those requests).

As will be described in more detail below, the main function of the location authentication web service system 10 is to authenticate that a user access request to the web server system 20 was indeed generated from a client system close to the physical entity 11. To accomplish this, the system 10 includes a location beacon 23 adjacent to the physical entity 11. The term "adjacent to" is hereinafter defined as in, on, around, within, near, above, or over. This means that the location beacon 23 can be placed or located in, on, around, within, near, above, or over the physical entity 11.

The location beacon 23 transmits a first beacon signal containing a web address of the web server system 20 and a location token that expires within a predetermined time period. The location beacon 23 uses a secret key stored in a secret key store 24 to generate the location token which contains a time stamp. The location beacon 23 has a predetermined transmission range.

When the client system 30 is close to the physical entity 11 (thus within the transmission range of the location beacon 23), the beacon receiver 31 in the client system 30 receives the first beacon signal. The client system 30 also includes a random number key generator 34 that generates a random number to be served as a key (hereinafter referred to as "random number key"). The key is used to verify communications between the web server system 20 and the client system 30, thus allowing the web server system 20 to be able to authenticate that the client system 30 is close to the physical entity 11 before servicing access requests from the client system 30.

The beacon receiver 31 includes an HTTP module (i.e., the module 102 in FIG. 6) that can generate a first request using the known HTTP protocol. The first request is then sent to the web server system 20 via the secured socket layer 35. This means that the first request is not a regular access request generated by a web browser to request web content and/or web services. The first request only requests the web server system 20 to transmit a second beacon signal containing the web address of the web server system 20 and a customized token that only the client system 30 can recognize or decrypt.

The first request includes the random number key and the location token. A location authentication module 21 in the web server system 20 retrieves the key from the first request if the location authentication module 21 determines that the location token in the first request has not expired. The location authentication module 21 also stores the key and the IP (Internet Protocol) address of the client system 30 in a lookup table of the web server system 20.

The key is sent to a location authentication beacon 22 which is also located adjacent to the physical entity 11. The location authentication beacon 22 uses the key to generate a customized token (i.e., the token that can only be received and decrypted by the client system 30 when it is close to the physical entity 11). The customized token is basically a location token encrypted using the key. The customized token also expires within a predetermined time and can only be received and decrypted by the client system 30.

The location authentication beacon 22 then transmits the second beacon signal. The location authentication beacon 22 also has a predetermined transmission range. When the client system 30 remains close to the physical entity 11 (thus within the transmission range of the location authentication beacon 22), the beacon receiver 31 in the client system 30 receives the second beacon signal. The second beacon signal can only be received and processed by the beacon receiver 31 because the customized token can only be decrypted by the key which is now shared by both the client system 30 and the web server system 20. The beacon receiver 31 uses the key to decrypt the customized token. If the beacon receiver 31 can decrypt the customized token (meaning the transmission is intended for the client system 31), then the web address and the customized token are passed to a web browser 32 of the client system 30. The web browser 32 sends a second request having the web address and the customized token to the web server system 20. The second request is the true access request from the client system 30 to the web server system 20 which requests the web service and/or content.

When the location authentication module 21 receives the second request from the client system 30, it uses the IP address to find the corresponding key stored in the lookup table and then authenticates the customized token using the key. If the customized token is authenticated, the secret key is used to expose the time stamp in the token. If the token and has not expired, then the location authentication module 21 controls a web server 25 (actually the content generator 27 of the web server 25) of the web server system 20 to provide or generate the web contents designed for access requests from client systems that are close to the physical entity 11. This can be in the form of unrestricted access or uncensored web content. Otherwise, the web server 25 provides or generates the web contents designed for access requests from client systems that are not close to the physical entity 11. This can be in the form of access restriction or censored web content, or the web server system 25 simply does not provide any service or content to the requests. The system 10 will be described in more detail below, also in conjunction with FIGS. 1 through 7.

Referring again to FIG. 1, the web server 25 of the web server system 20 represents the physical entity 11 in the virtual world by the contents contained in the web server 25. Here, the physical entity 11 can be a person, a place, or a thing/object. For example, the physical entity 11 can be a bookstore, a museum, a conference room, or a hotel room. The physical entity 11 can also be a convention center, a bus terminal or stop. Moreover, the physical entity 11 can be a book in a bookstore, a painting in a museum, an item on display in an exhibition hall or convention center.

The web representation of the physical entity 11 by the web server 25 means that the web server 25 contains or generates information and/or services related to the physical entity 11. The web representation also means that the web server 25 may also contain or generate written text, audio, video, and/or images to describe the physical entity 11. For example, if the physical entity 11 is a car in an exhibition hall, the web server 25 can generate a list of all the features of the car. It may also include some audio information about the car. Moreover, two-dimensional or three-dimensional images may also be included to illustrate the internal structure of the car. The web server 25 may also contain or generate video programs about the car. The web server 25 can also allow on-line order of the car. In this case, the customer may actually order a custom-built car of the same brand. As a further example, when the physical entity 11 is a conference room, the web contents can be (1) the on-line conference room booking services, and/or (2) web pages describing and/or showing the conference room. If the physical entity 11 is an exhibition hall, the web contents can be web pages describing and/or showing the layout of the exhibition hall and various services (e.g., food, gift shops, post office, banks, ATM machines, etc.) provided inside the hall, and/or the web pages that provide general description of the exhibition hall (e.g., direction, hours, address, and contact information, etc.).

The web server 25 includes a HTTP engine 26 and a content generator 27. The HTTP engine 26 receives and handles access requests to the web server system 20. The access requests are sent to the web server system 20 from various client systems via the global Internet 40. Here, the global Internet 40 means the Internet that people now know. This means that an open standard transmission protocol is used to transmit the access requests. In one embodiment, the open standard communication protocol is the HTTP (Hyper Text Transport Protocol) protocol. Alternatively, other open standard communication protocols may be used.

Here, an access request to the web server system 20 typically includes some or all of the following data items, although not necessarily in the order described below. The order of the data items is to facilitate the description of the present invention only. The first data information is the web address of the web server system 20. The web address helps direct the address request to the HTTP engine 26 of the web server system 20 via the global Internet 40. The second data information of the access request is the IP (Internet Protocol) address of the access request. The IP address uniquely identifies the origin of the access request. This means that the IP address identifies from which user terminal or client system the access request is generated. The third data information of the access request is the arguments and/or parameters that specify what response the web server 25 should provide or generate to the access request.

The fourth data information contained in the access request can either be the location token and the random number key, or the customized token. Not all requests to the web server system 20 contain either the customized token or the location token plus the random number key. If a client system (e.g., the client system 30) is close to the physical entity 11 when receiving the web address of the web server system 20, then the access request generated by the client system 30 to the web server system 20 contains the location token and the random number key. The location token is an encrypted token and contains a time stamp. The token, when generated, is a series of numbers. A secret key is used to generate the location token as well as decrypt the token in the web server system 20. The secret key is stored in a secret key store 24. The use of the secret key to encrypt and decrypt the location token is to prevent any possible tampering with the time stamp contained in the location token.

If the client system 30 remains close to the physical entity 11 after generating the access request to the web server system 20 that contains the location token and the random number key, the client system 30 generates a next access request that contains the customized token. Like the location token, the customized token is an encrypted token using the secret key and contains a time stamp. Unlike location token, the customized token is encrypted again using the random number key so that it can only be decrypted by the client system 30 and the web server system 20. The access request may contain more or less data information than the above mentioned ones.

In one embodiment, the location token or the customized token is contained in a cookie that is attached to the respective HTTP access request. In another embodiment, the location token or the customized token is not contained in a cookie, but is directly attached to the access request.

As described above, the HTTP engine 26 receives and handles access requests to the web server system 20. The engine 26 also sends responses to these access requests back to their respective requesting client systems. These functions of the HTTP engine 26 are known and will not be described in more detail below.

In accordance with one embodiment of the present invention, the HTTP engine 26 includes the function of separating the location token and the random key, if any, from an access request that contains the location token and the key. The HTTP engine 26 also includes the function of separating the customized token, if any, from an access request that contains the customized token. The HTTP engine 26 also determines if the request requests contents from the web server system 20. If so, the request is sent to the content generator 27 of the web server 25.

The main function of the content generator 27 is to provide or generate web contents regarding or related to the physical entity 11. As described above, the web contents contained or generated can be web content pages, application programs, and/or a combination thereof. The application programs can be e-commerce application programs that provide e-commerce services. The application programs can be other types of application programs such as on-line conference room booking or scheduling. The application programs can also be content generating programs that can generate web content pages on-the-fly based on parameters and/or arguments in the access requests.

Figure 4:
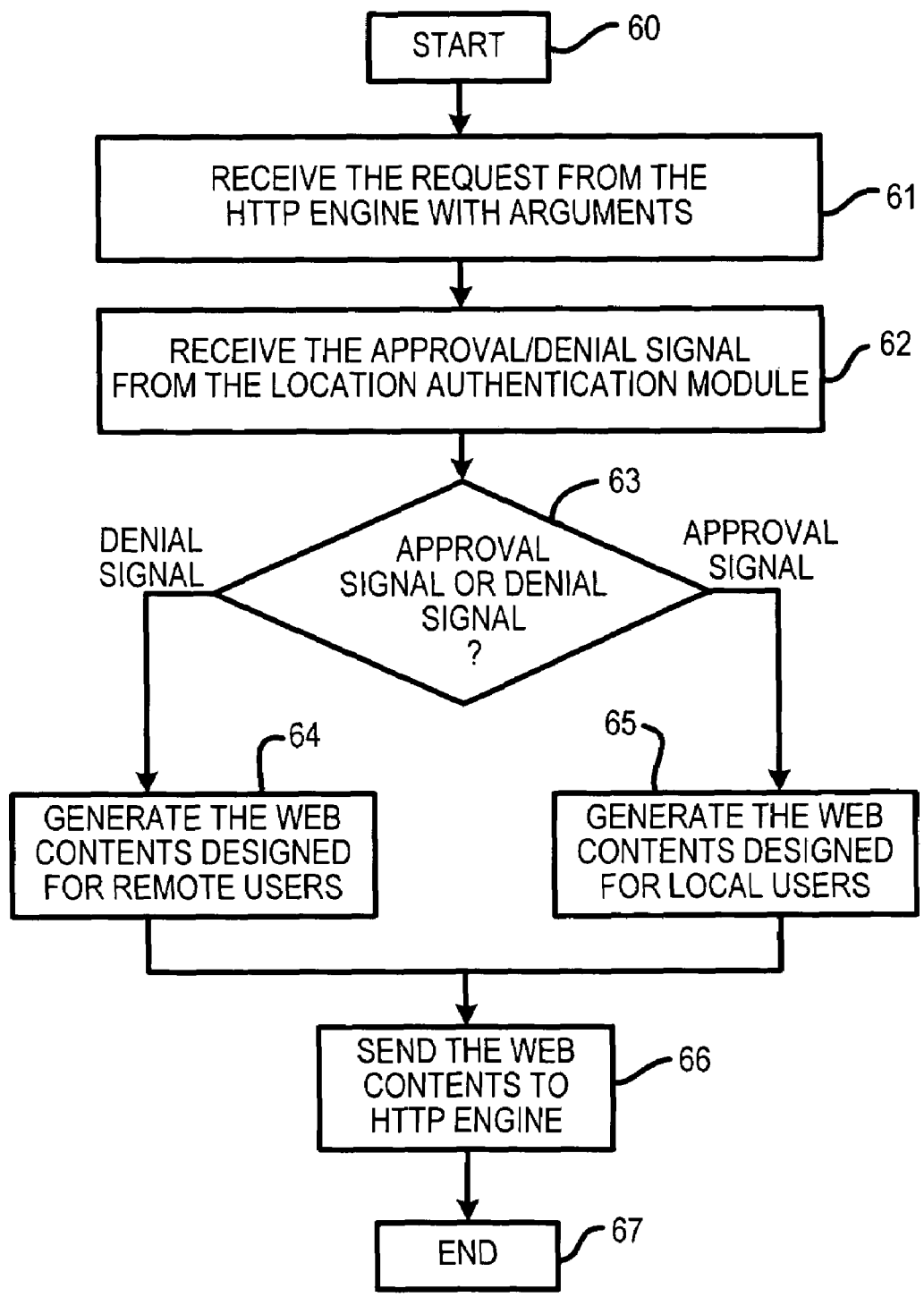
FIG. 4 shows the flow chart diagram of the content generating process of the content generator of the web server system of FIG. 1.

In accordance with one embodiment of the present invention, the content generator 27 is capable of providing or generating different types of web contents for access requests with the same IP address (i.e., coming from the same client system). For example, if the physical entity 11 is a conference room, the content generator 27 can provide or generate on-line conference room booking and billing services as well as web pages describing and/or showing the conference room. As a further example, if the physical entity 11 is an exhibition hall, the content generator 27 can provide or generate web pages describing and/or showing the layout of the exhibition hall and various services (e.g., food, gift shops, post office, banks, ATM machines, etc.) provided inside the hall, as well as web pages providing general description of the exhibition hall (e.g., direction, hours, address, and contact information, etc.). Which type of web contents the content generator 27 is to provide is controlled by the location authentication module 21 (described in more detail below). FIG. 4 shows the operation process of the content generator 27.

As can be seen from FIG. 4, the process starts at the step 60. At the step 61, the content generator 27 receives the request from the HTTP engine 26. As described above, the request received by the content generator 27 contains arguments and/or parameters that specifies the request. At the step 62, the content generator 27 receives the approval or denial signal from the location authentication module 21. At the step 63, the content generator 27 determines whether the received signal is the approval signal or the denial signal. If the signal is the denial signal, the step 64 is performed, at which the content generator 27 provides or generates the web contents designed for remote users (i.e., for user access requests that do not contain the location token or the token contained has expired).

If, at the step 63, it is determined that the received signal is the approval signal, then the step 65 is performed, at which the content generator 27 provides or generates the web contents designed for local users (i.e., for user access requests that contain the unexpired location token). Then the web contents are sent to the HTTP engine 26. The process then ends at the step 67.

Referring back to FIG. 1, the location authentication module 21 is used to validate location tokens and customized tokens. If the location authentication module 21 receives a location token, it validates the location token. Once the location token is validated, the location authentication module 21 sends the random number key to the location authentication beacon 22.

If the location authentication module 21 receives a customized beacon, the location authentication module 21 decrypts and validates the customized token. The location authentication module 21 uses the key to decrypt the customized token and uses the secret key to expose the time stamp contained in the token so that the time stamp can be validated. Once the customized token is validated, the location authentication module 21 causes the content generator 27 to generate or provide the requested web content to the request that contains the customized token. The operation of the location authentication module 21 is shown in FIGS. 5A–5B, which will be described in more detail below.

Figure 5A:
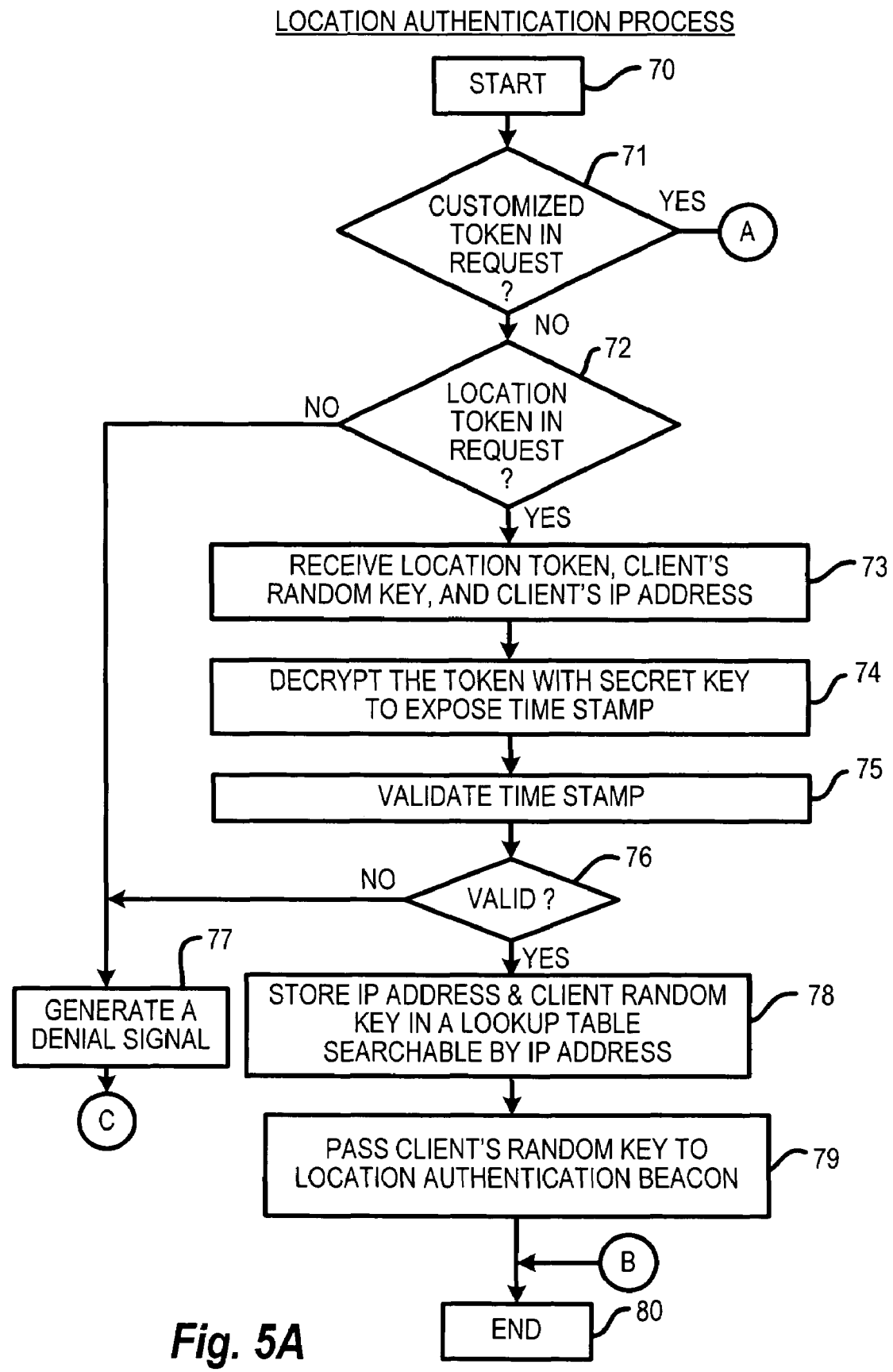
FIGS. 5A and 5B show the flow chart diagram of the location authentication process of the location authentication module of the web server system of FIG. 1.
Figure 5B:
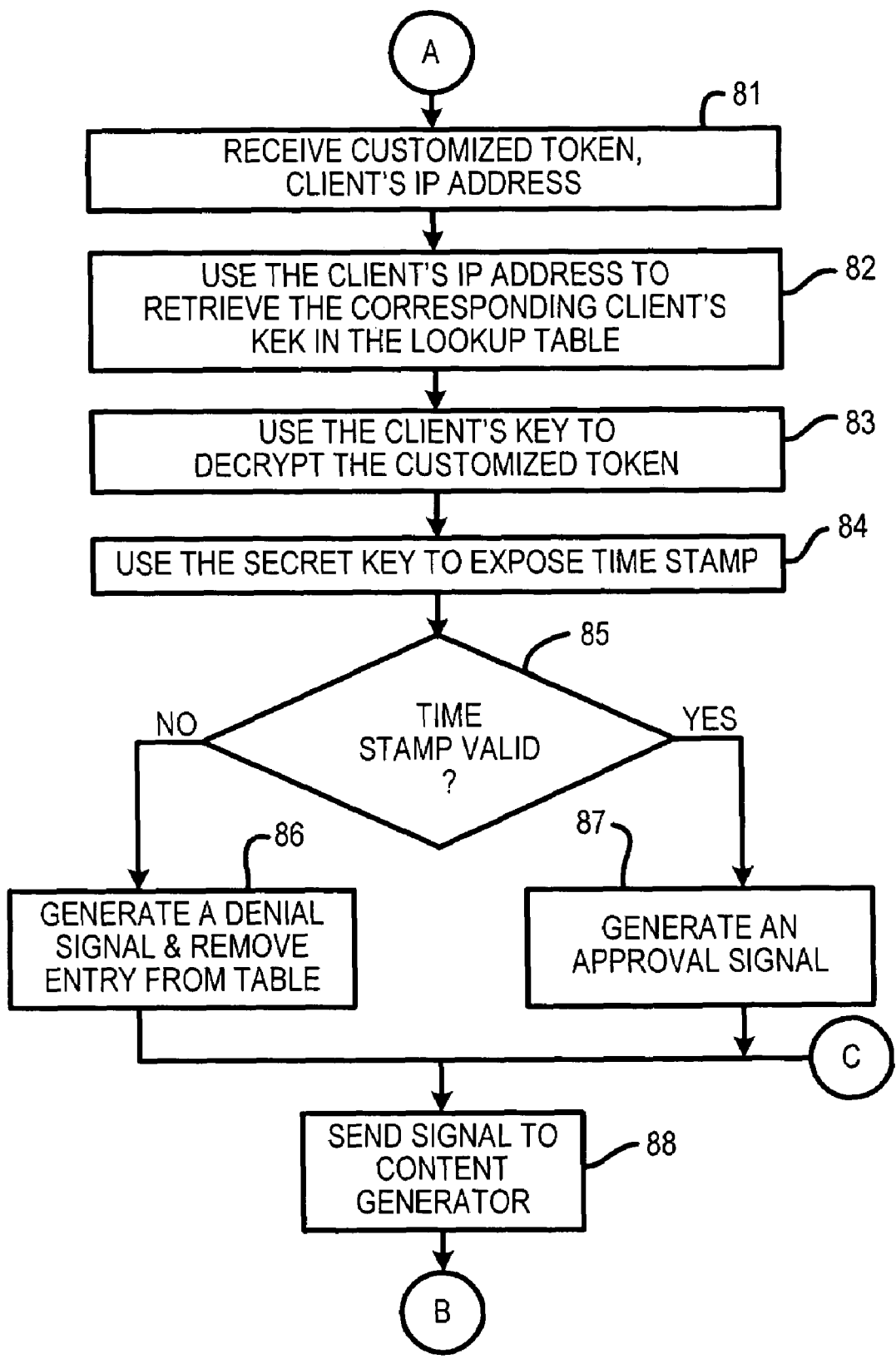

As can be seen in FIGS. 5A and 5B, the process starts at the step 70. At the step 71, the location authentication module 21 determines if the token is a customized token. If so, the process moves to the step 81. If not, the process moves to the step 72 to determine if the token data field of the request contains a location token. If not (meaning that the client system 30 did not receive the web address of the web server system 20 when it was close to the physical entity 11), the step 77 is performed, at which the location authentication module 21 causes the content generator 27 of FIG. 1 to send a denial signal.

If the request is determined to contain a location token at the step 72, then the step 73 is performed. At the step 73, the location token, the client's random number key, and the IP address of the requesting client are received by the location authentication module 21. At the step 74, the location authentication module 21 decrypts the location token using the secret key stored in the secret key store 24. As described above, the secret key is used to generate the location token. The decryption will expose the time stamp contained in the location token. The time stamp is embedded into the location token when the token was first generated. The time stamp indicates the time at which the location token expires (based on the time at which the location token was generated plus the valid time duration or interval). The duration is on the order of minutes and is chosen for its specific use. At the step 75, the location authentication module 21 validates the time stamp by comparing the time stamp with the current time.

If, at the step 76, the location authentication module 21 determines that the received location token has expired, then the location authentication module 21 moves to the step 77 to control the content generator 27 to generate the denial signal.

If, at the step 76, the location authentication module 21 determines that location token is valid and unexpired, then the location authentication module 21 stores the IP address and the random number key of the request in a lookup table searchable by the IP address. At the step 79, the location authentication module 21 passes the key to the location authentication beacon 22. This completes the process of handling the location token and the process can end at the step 80.

At the step 81, the location authentication module 21 starts to process the customized token. At the step 82, the location authentication module 21 uses the IP address of the request to search its lookup table to locate and retrieve the random number key for the customized token. At the step 83, the random number key is used to perform the first level decryption. After that, the secret key is used to expose the time stamp at the step 84.

If, at the step 85, the customized token has expired, the step 86 is performed, at which the location authentication module 21 generates the denial signal such that the content generator 27 generates the web contents designed for access requests generated from remote client systems. In addition, the entry for the key and IP address is removed from the lookup table at the step 86.

If, at the step 85, the customized token has not expired, step 87 is performed, at which the location authentication module 21 generates a approval signal. At the step 88, the signal is sent to the content generator 27. The process then ends at the step 80.

Referring back to FIG. 1, the location beacon 23 is used to store and transmit a first beacon signal that contains the web address (i.e., URL) of the web server system 20 and the location token. Although the physical entity 11 might be physically separated from the location sensitive web server system 20, the location beacon 23 is located or placed adjacent to the physical entity 11. As defined above, the term "adjacent to" means that the location beacon 23 can be placed or located on, in, within, around, near, over, or above the physical entity 11. For example, if the physical entity 11 is a small object (e.g., a car or a painting in a museum), the location beacon 23 can be placed near or on the object. If the physical entity 11 is a place (e.g., a conference room or museum), the location beacon 23 can be placed in the front of the place or inside the place. In essence, the location beacon 23 can be treated like a poster. Alternatively, the entire web server system 20 is located or placed adjacent to the physical entity 11.

Figure 2:
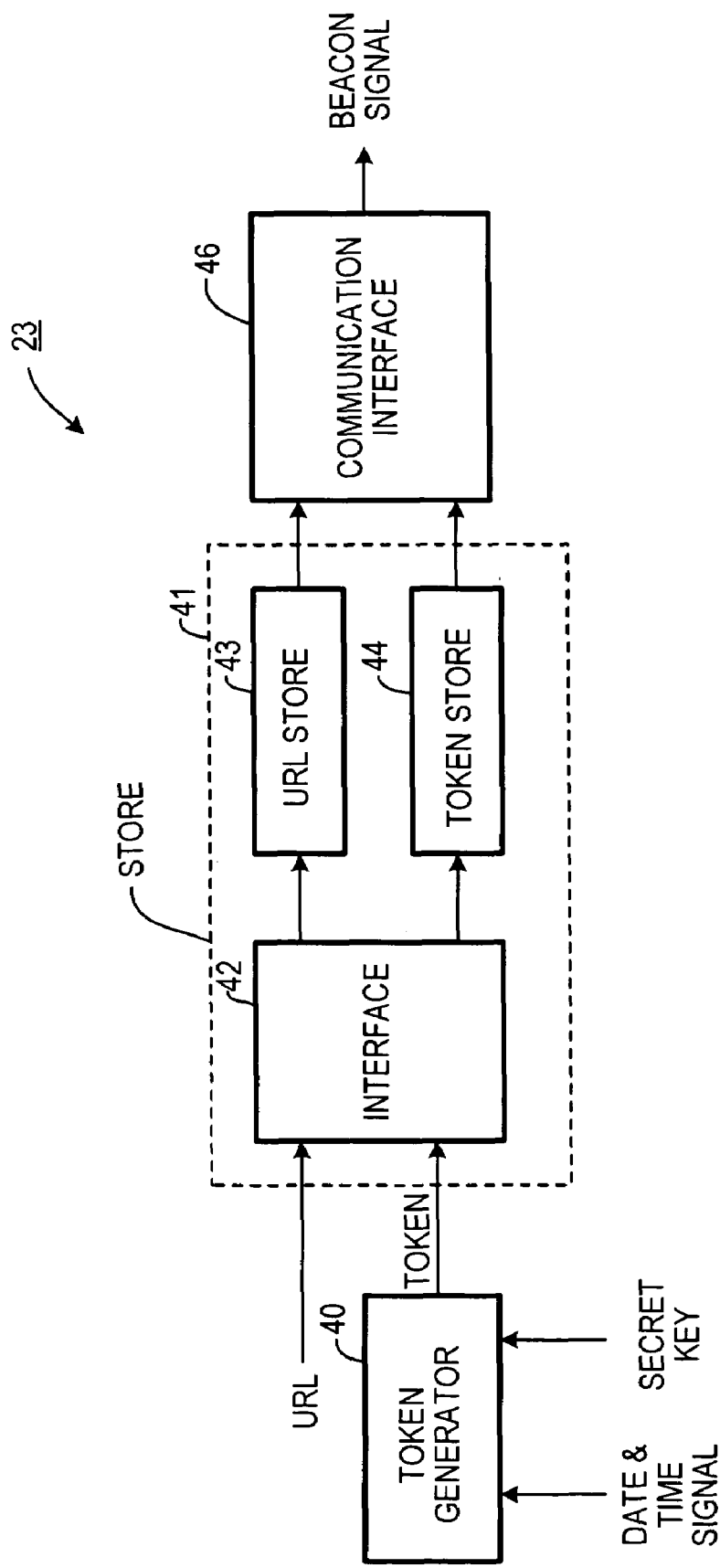
FIG. 2 shows the structure of the location beacon of the web server system of FIG. 1.

FIG. 2 shows the structure of the location beacon 23. As can be seen from FIG. 2, the location beacon 23 includes a token generator 40, a store 41, and a communication interface 46. The communication interface 46 is used to broadcast or transmit the beacon signal in accordance with a predetermined open standard communication protocol. The communication interface 46 can be implemented using any known wireless communication means that broadcasts or transmits signals (referred to as beacon signal). In one embodiment, the communication interface 46 constantly transmits the beacon signal. In another embodiment, the communication interface 46 periodically transmits the beacon signal. Alternatively, the communication interface 46 transmits the beacon signal whenever activated by external stimulus.

The transmission range of the communication interface 46 is determined by the communication technology adopted by the communication interface 46. In one embodiment, the communication technology employed by the communication interface 46 can be a short range wireless technology such as infrared (e.g., the IrDA technology developed by several companies including Hewlett-Packard Company of Palo Alto, Calif.), ultra-sound, or the low power, high frequency, short-range radio (2.4–5 Ghz) transmission (e.g., the Bluetooth technology developed by several telecommunications and electronics companies).

In one embodiment, the communication interface 46 has a transmission range of approximately three to six feet. Alternatively, the transmission range of the communication interface 46 can be shorter than three feet or longer than six feet. In one embodiment, only the communication interface 46 is placed or located adjacent to the physical entity 11. In another embodiment, the entire location beacon 23 is placed or located adjacent to the physical entity 11.

The store 41 includes a URL store 43 and a token store 44. The URL store 43 stores the web address of the web server system 20 (FIG. 1). The token store 44 stores the location token. Each of the stores 43–44 can be electronically updated with new information. Each of the stores 43–44 can store information volatilely or non-volatilely. An interface 42 is used to supply data to each of the stores 43–44.

Each of the stores 43–44 stores a predetermined amount of data. In one embodiment, the URL store 43 can store 128 bytes of data. In alternative embodiments, the URL store 43 can be longer or shorter than 128 bytes. The web address stored in the URL store 43 can be in various forms. In one embodiment, the web address stored in the URL store 43 is already decoded into the binary form. In another embodiment, the web address stored is in the "name=value" pair form (i.e., the Extensible Markup Language (XML) form). Alternatively, the web address stored in the URL store 43 can be in other forms (e.g., WML form). In addition, the URL store 43 can store more information than just the web address.

In one embodiment, the token store 44 can store 128 bytes of data. In alternative embodiments, the token store 44 can be longer or shorter than 128 bytes.

The location beacon 23 also includes a token generator 40. The token generator 40 receives a date and time signal and the secret key from the secret key store 24 (FIG. 1). The token generator 40 generates the location token. This location token is essentially a time stamp. Then the location token is encrypted using the secret key. In one embodiment, the encryption is done using any known symmetric encryption technology. In another embodiment, the encryption is done using any known asymmetric encryption technology. In this case, different keys are used to encrypt and decrypt the location token. The encryption is to prevent user tampering of the time stamp in the location token. The encrypted token is then sent to the token store 44 via the interface 42.

The token generator 40 periodically generates a new location token. This means that each location token generated has a different time stamp. In one embodiment, the token generator 40 generates a new location token in every two minutes. In another embodiment, the token generator 40 generates a new location token in every ten minutes, or any time interval in-between.

Referring back to FIG. 1, the first beacon signal from the location beacon is captured by the client system 30 if the client system 30 is close to the physical entity 11 (thus within the transmission range of the location beacon 23). The client system includes the beacon receiver 31, the web browser 32 and the random number key generator 34. When the beacon receiver 31 receives the first beacon signal, it separates or parses the web address and the location token from the beacon signal. The beacon receiver 31 causes the random number generator 34 to generate the random number key (i.e., the client's key). The beacon receiver 31 then generates the first signal to be sent to the web server system 20. As described above, the first request includes the web address of the web server system 20, the location token, and the key. The first request is sent to the web server system 20 via secure communication (i.e., the secured socket layer 35 and the secured socket layer 29 in the web server system 20).

The key is used by the location authentication beacon 22 to generate the customized token. The location authentication beacon 22 stores and transmits another beacon signal that contains the web address (i.e., URL) of the web server system 20 and the customized token. Like the location token 23, the location authentication token 22 is also located or placed adjacent to the physical entity 11. The structure of the location authentication beacon 22 is shown in FIG. 3, which will be described in more detail below.

Figure 3:
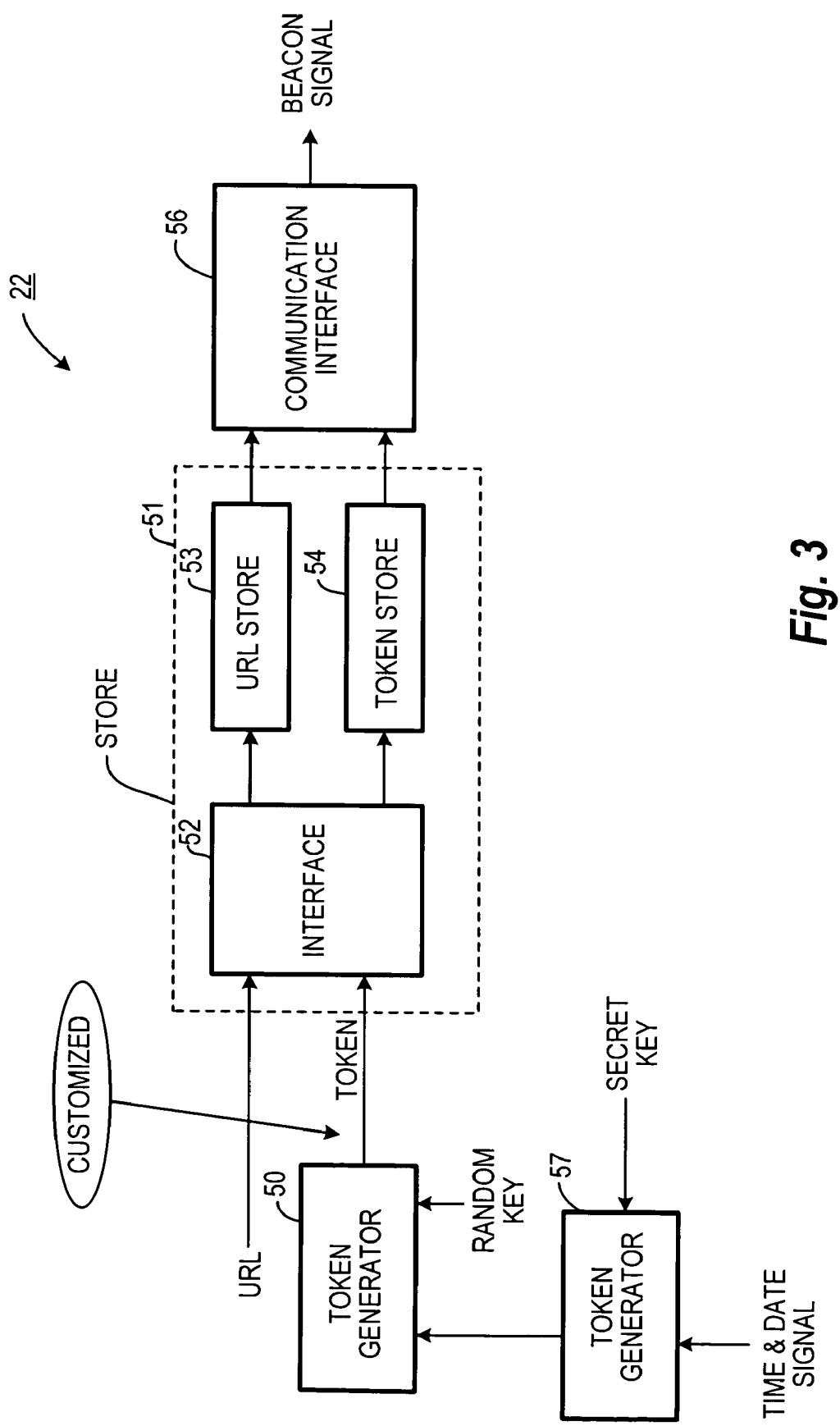
FIG. 3 shows the structure of the location authentication beacon of the web server system of FIG. 1.

As can be seen from FIGS. 2–3, the structure of the location authentication beacon is substantially similar to that of the location beacon 23, except that the location authentication beacon 22 includes a second token generator (i.e., the generator 50) that further encrypts the location token encrypted by the token generator 57 using the secret key to generate the customized token. In other words, the customized token is the location token further encrypted using the random number key.

Referring to FIG. 1, when the client system 30 remains close to the physical entity 11, the beacon receiver 31 captures the beacon signal from the location authentication beacon 22. The beacon receiver 31 then uses the random number key in the client system 30 to determine if the customized token is indeed the customized token the client system 30 wants. This is done by using the key to decrypt the customized token. If the token can be decrypted by the key, it means that the token is the customized token intended for the client system 30 to receive when close to the physical entity 11. In this case, the customized token is stored in the cookie cache 33

If the client system 30 is not the intended recipient of the customized token, it cannot decrypt the customized token received because it does not contain the appropriate key. In this case, the token is not stored in the cookie cache 33 and the web browser 32 does not generate the second request. The web browser 32 can be any known web browser.

Figure 6:
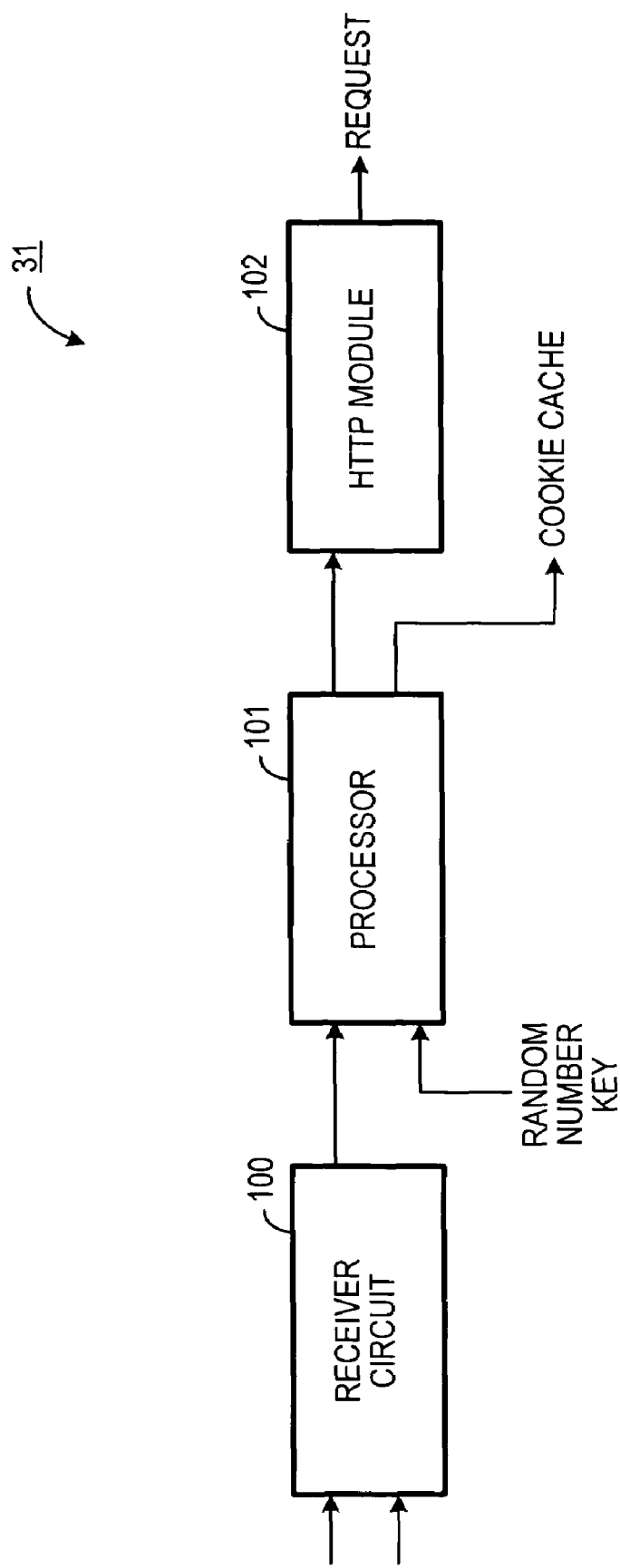
FIG. 6 shows the structure of the beacon receiver of the client system of FIG. 1.

FIG. 6 shows the structure of the beacon receiver 31. As can be seen from FIG. 7, the beacon receiver includes a receiver circuit 100, a processor 101, and an HTTP module 102. The receiver circuit 100 performs signal receiving, capturing, and processing functions. These functions are known in the art and will not be described in more detail below. The processor 101 is used to separate or parse various data items from the received beacon signals. This is also done using known technology. The control of the processor 101 is through a state machine having a number of states shown in FIG. 7. The HTTP module 102 generates the first request to the web server system 20. The HTTP module 102 is implemented using known means.

Figure 7:
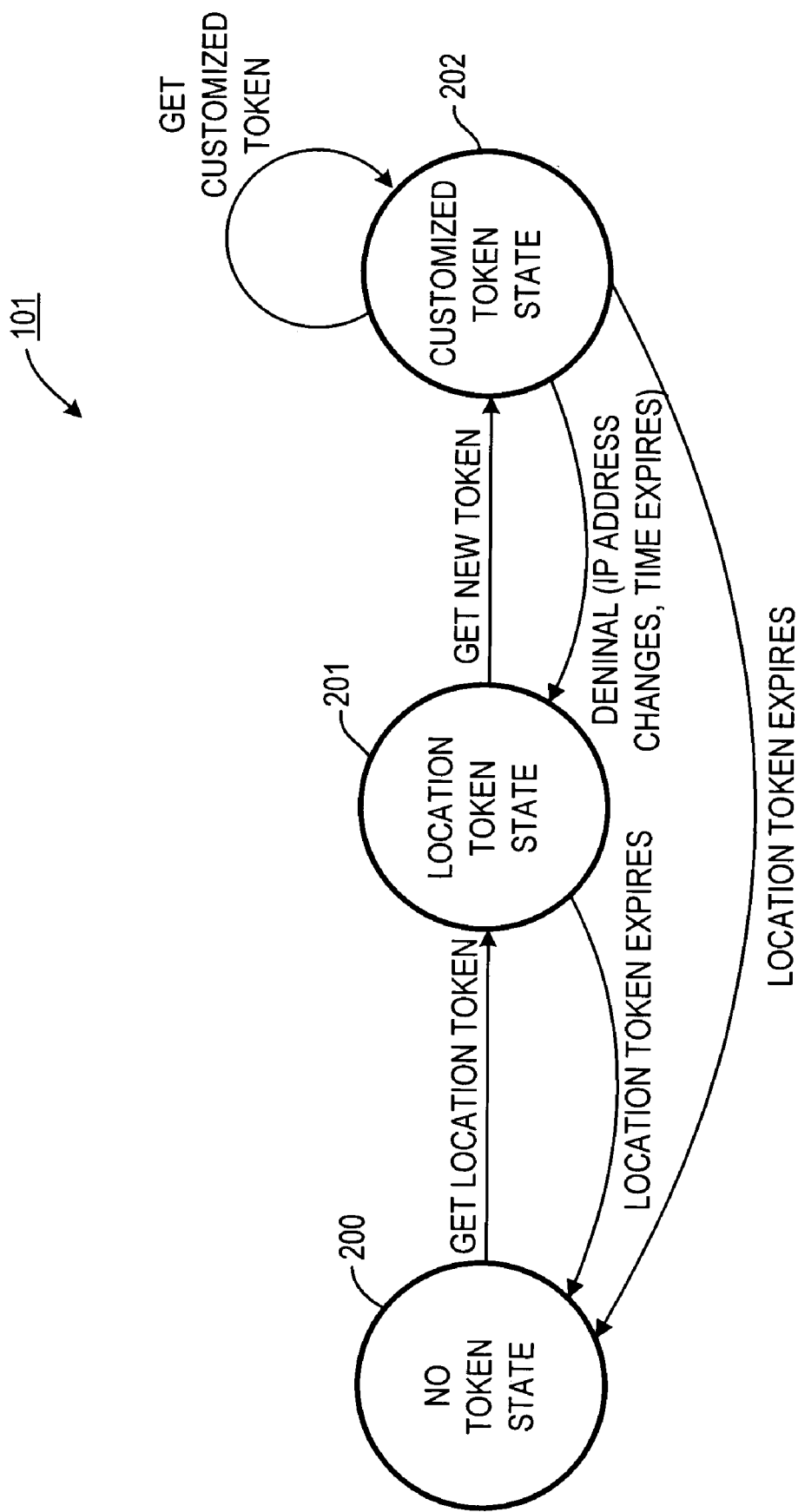
FIG. 7 shows the state diagram of the processor of the beacon receiver of FIG. 6.

As can be seen from FIG. 7, the processor 101 is originally in the state 200 (i.e., NO TOKEN STATE). In this state 200, the processor 101 waits to receive the beacon signal from the location beacon 23 (FIG. 1).

When a beacon signal containing a location token is received, the processor 101 moves to the state 201 (i.e., LOCATION TOKEN STATE). At this state 201, the processor 101 stops waiting to receive any further beacon signal from the location beacon 23, separates the location token from the beacon signal received. If the token expires, the processor 101 moves back to the state 200. If the token has not expired, the processor 101 causes the random number generator 34 to generate the random number key. The processor 101 also sends the location token and the key to the module 102 to request a customized token.

When a beacon signal containing a customized token is received, the processor 101 moves to the state 202 (i.e., CUSTOMIZED TOKEN STATE). At this state, the processor 101 extracts, separates, or parses the customized token from the beacon signal. If the processor 101 cannot extract the customized token (e.g., IP address changed, time expired), the processor 101 is then moved to the state 201. When this customized token has expired, the processor 101 returns to the state 200.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A system for a physical entity for authenticating that a user access request to the system is generated from a client system close to the physical entity, comprising a web server for providing web content designed for an access request from the client system close to the physical entity;

a location beacon adjacent to the physical entity to transmit within a predetermined transmission range a first beacon signal containing a web address of the web server and a location token for indicating physical presence of the client system close to the physical entity and which expires within a predetermined time period;

a location authentication module for authenticating that the client system having received the first beacon signal is still close to the physical entity wherein the location authentication module receives a first request including the web address, the location token, and a key from the client system;

a location authentication beacon adjacent to the physical entity and communicatively coupled to the location authentication module for receiving the key and the location token and for encrypting a customized location token that expires in a predetermined time period using the key and for transmitting a second beacon signal within the predetermined transmission range containing the web address and the customized token; and responsive to receiving a second request from the client system including the customized token and the web address, the location authentication module causes the web server to provide content designed for an access request from the client system close to the physical entity if the customized location token has not expired.

2. The system of claim 1, wherein responsive to the location token in the first request being expired, the location authentication module causes the web server to provide web content designed for an access request from a client system not close to the physical entity.

3. The system of claim 1, wherein the customized token also expires within a predetermined time period, wherein if the location authentication module determines that the customized token has expired, then the location authentication module does not cause the web server to service the second request.

4. The system of claim 1, wherein the key is a random number generated by the client system.

5. The system of claim 1, wherein the location authentication beacon further comprises
 a first token generator that generates the un-encrypted customized token using a stored secret key;
 a second token generator that encrypts the customized token using a random number key;
 a store that stores the customized token and the web address;
 a communication interface that receives the web address and the customized token from the store and transmits the second beacon signal.

6. A system for authenticating the location of a client system
 accessing a web server system for a physical entity, comprising in the web server system,
 a location beacon adjacent to the physical entity to transmit within a predetermined transmission range a first beacon signal containing a web address of the web server system and a location token for indicating physical presence of the client system close to the physical entity and which expires within a predetermined time period;
 a location authentication module for authenticating that the client system having received the first beacon signal is still close to the physical entity wherein the location authentication module receives a first request including the web address, the location token, and a key from the client system;
 a location authentication beacon adjacent to the physical entity and communicatively coupled to the location authentication module for receiving the key and the location token and for encrypting a customized location token that expires in a predetermined time period using the key and for transmitting a second beacon signal within the predetermined transmission range containing the web address and the customized token;
 responsive to receiving a second request from the client system including the customized token and the web address, the location authentication module causes the web server to provide content designed for an access request from the client system close to the physical entity;
 in the client system,
 a random number generator that generates the key; and
 a beacon receiver that receives the first and second beacon signals, wherein the beacon receiver generates the first request that includes the key and sends the customized token to a web browser of the client system such that authenticity and location of the client system is verified.

7. The system of claim 6, wherein responsive to the location token in the first request being expired, the location authentication module causes the web server to provide web content designed for an access request from a client system not close to the physical entity.

8. The system of claim 6, wherein the customized token also expires within a predetermined time period, wherein if location authentication module determines that the customized token has expired, then the location authentication module does not cause the web server to service the second request.

9. The system of claim 6, wherein the beacon receiver further comprises
 a receiver circuit that receives the beacon signals and parse the tokens from the beacon signals;
 a processor coupled to the receiver circuit to control the receiver circuit to either receive the first beacon signal or the second beacon signal;
 a request generation module that generates the first request that contains the key.

10. The system of claim 6, wherein the location authentication beacon further comprises
 a first token generator that generates a token using a stored secret key;
 a second token generator that encrypts the token using the random number key such that the encrypted token becomes the customized token;
 a store that stores the customized token and the web address;
 a communication interface that receives the web address and the customized token from the store and transmits the second beacon signal.

11. A method of authenticating the location of a client system accessing a web server system associated with a physical entity, comprising
 transmitting within a predetermined transmission range a first beacon signal containing a web address of the web server system and a location token for indicating physical presence of the client system close to the physical entity and which expires within a predetermined time period from a location beacon adjacent to the physical entity;

generating a random number key in the client system close to the physical entity and sending a first request from the client system to the web server system responsive to the client system receiving the first beacon signal, wherein the first request contains the web address, the location token and the key;

retrieving the key from the first request in the web server system if the location token has not expired and encrypting a customized token that expires in a predetermined time period using the key;

transmitting a second beacon signal within the predetermined transmission range containing the web address and the customized token from a location authentication beacon adjacent to the physical entity; and decrypting the customized token in the client system using the key to determine if the second beacon signal is intended for the client system.

12. The method of claim 11, further comprising sending a second request to access the web server system if the customized token can be decrypted in the client system using the key, wherein the second request contains the web address of the web server system and the customized token;

causing the web server system to provide content designed for an access request from a client system close to the physical entity responsive to the second request if the customized token in the second request has not expired; and causing the web server system not to service the second request if the customized token in the second request has expired.

* * * * *